(12) United States Patent
Shepelev et al.

(10) Patent No.: US 10,679,030 B2
(45) Date of Patent: Jun. 9, 2020

(54) OPTICAL FINGERPRINT SENSOR ILLUMINATION USING A DISPLAY

(71) Applicant: SYNAPTICS INCORPORATED, San Jose, CA (US)

(72) Inventors: Petr Shepelev, Campbell, CA (US); Erik Thompson, Phoenix, AZ (US); Michitoshi Honma, Tokyo (JP); Toshifumi Ogata, Tokyo (JP); Goro Sakamaki, Tokyo (JP); Takashi Nose, Tokyo (JP); Hirobumi Furihata, Tokyo (JP)

(73) Assignee: SYNAPTICS INCORPORATED, San Jose, CA (US)

( * ) Notice: Subject to any disclaimer, the term of this patent is extended or adjusted under 35 U.S.C. 154(b) by 103 days.

(21) Appl. No.: 15/916,034

(22) Filed: Mar. 8, 2018

(65) Prior Publication Data
US 2019/0278967 A1 Sep. 12, 2019

(51) Int. Cl.
| | |
|---|---|
| *G06K 9/00* | (2006.01) |
| *G09G 3/20* | (2006.01) |
| *G09G 3/32* | (2016.01) |
| *G06F 3/042* | (2006.01) |
| *G06F 21/32* | (2013.01) |
| *G06K 9/20* | (2006.01) |

(52) U.S. Cl.
CPC ......... *G06K 9/0004* (2013.01); *G09G 3/2007* (2013.01); *G09G 3/32* (2013.01); *G06F 3/042* (2013.01); *G06F 21/32* (2013.01); *G06K 9/2027* (2013.01); *G09G 3/2011* (2013.01); *G09G 2320/0271* (2013.01); *G09G 2320/0626* (2013.01); *G09G 2320/0673* (2013.01); *G09G 2320/0686* (2013.01)

(58) Field of Classification Search
CPC ........ G06F 3/042; G06F 3/0421; G06F 3/041; G06F 21/32; G06K 9/00006; G06K 9/0004; H04L 63/0861; H04L 9/3231; G06Q 20/40145; G09G 3/32; G09G 3/2007; G09G 2320/0626; G09G 2320/0673; G09G 2320/0686; G09G 2320/0271
See application file for complete search history.

(56) References Cited

U.S. PATENT DOCUMENTS

| | | | |
|---|---|---|---|
| 2017/0193964 A1* | 7/2017 | Wen ..................... | G09G 3/2003 |
| 2018/0096660 A1* | 4/2018 | Liu ....................... | G09G 3/2003 |
| 2018/0114047 A1* | 4/2018 | Kim ...................... | G06F 3/0412 |
| 2018/0196931 A1* | 7/2018 | Cho ........................ | G06F 21/32 |
| 2019/0019000 A1* | 1/2019 | Lee ....................... | G06K 9/0004 |
| 2019/0019048 A1* | 1/2019 | Deng .................. | G06K 9/00912 |

(Continued)

*Primary Examiner* — Darlene M Ritchie
(74) *Attorney, Agent, or Firm* — Patterson + Sheridan, LLP

(57) ABSTRACT

An example method of illuminating an optical fingerprint sensor integrated with a display, where the display includes a fingerprint (FP) pixel region and an outer pixel region exclusive of the FP pixel region, is described. The method includes: processing image data in display driver circuitry configured to drive the display to present an image; adjusting a first brightness setting, during the processing of the image data, corresponding to both the FP pixel region and the outer pixel region to provide illumination for the optical fingerprint sensor; and adjusting a second brightness setting, during the processing of the image data, corresponding to only the outer pixel region.

28 Claims, 8 Drawing Sheets

(56) References Cited

U.S. PATENT DOCUMENTS

| | | | |
|---|---|---|---|
| 2019/0065808 A1* | 2/2019 | Zhang | G06F 3/0412 |
| 2019/0102016 A1* | 4/2019 | Kim | G02F 1/1333 |
| 2019/0102063 A1* | 4/2019 | Qian | G06F 3/0488 |
| 2019/0102597 A1* | 4/2019 | Lu | G06K 9/0004 |
| 2019/0189040 A1* | 6/2019 | Shin | G09G 3/20 |
| 2019/0228740 A1* | 7/2019 | Aflatooni | G09G 5/10 |

* cited by examiner

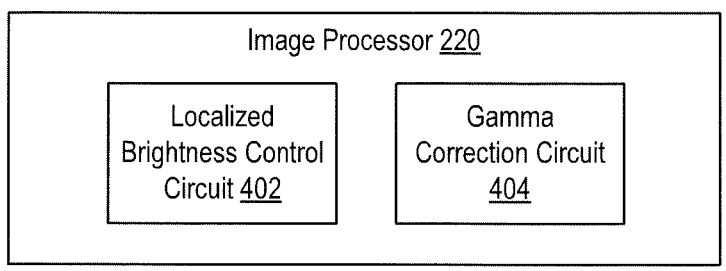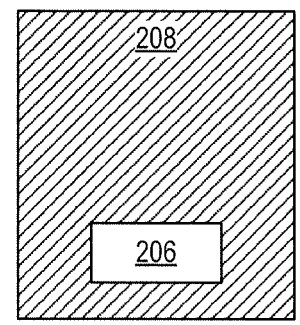
FIG. 4          FIG. 5
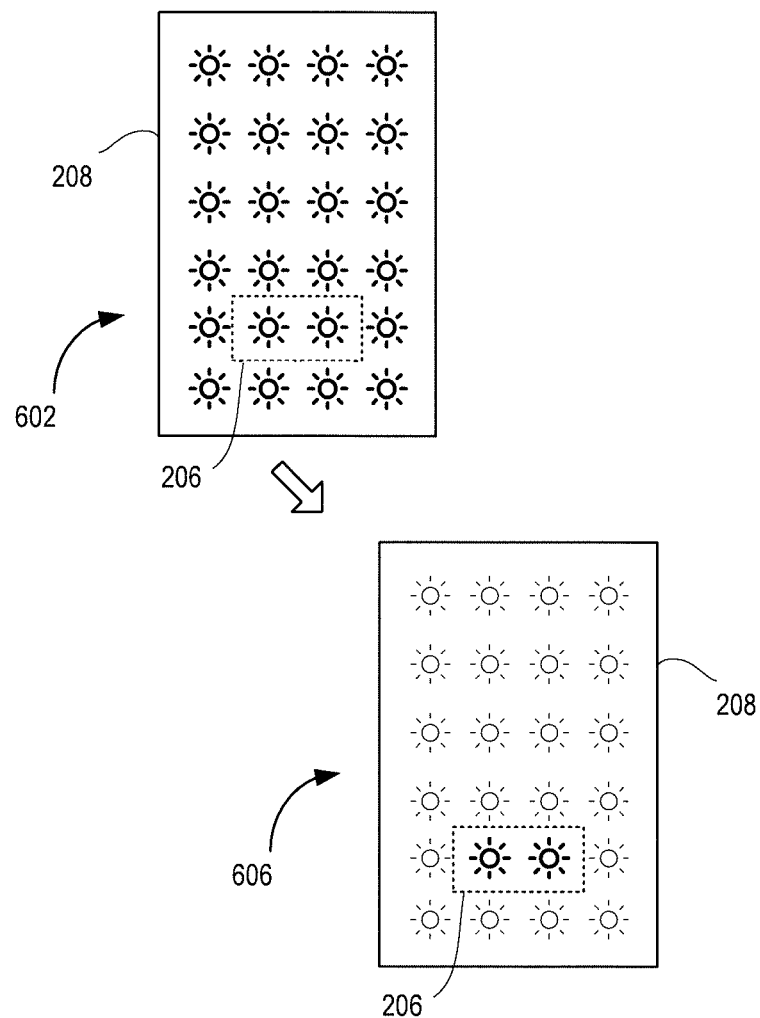
FIG. 6

OPTICAL FINGERPRINT SENSOR ILLUMINATION USING A DISPLAY

BACKGROUND

Field of the Disclosure

Embodiments of disclosure generally relate to displays and, more particularly, to optical fingerprint sensor illumination using a display.

Description of the Related Art

A system with a display and an optical fingerprint sensor can include an optical fingerprint sensing integrated circuit (IC) disposed behind the display. A part of the display can be used to illuminate the region above the fingerprint sensing IC. In one technique, a higher than usual brightness mode is used, which has a global effect on the entire image being displayed. As a consequence, the portion of the image outside of the fingerprint sensing region has increased brightness, which cause a bright flash or flicker. It is desirable to provide illumination for a fingerprint sensor without substantially affecting the image being displayed outside of the fingerprint sensing region.

SUMMARY

In an embodiment, a method of providing illumination for an optical fingerprint sensor integrated with a display, the display having a fingerprint (FP) pixel region and an outer pixel region exclusive of the FP pixel region, is described. The method includes: processing image data in display driver circuitry configured to drive the display to present an image; adjusting a first brightness setting, during the processing of the image data, corresponding to both the FP pixel region and the outer pixel region to provide illumination for the optical fingerprint sensor; and adjusting a second brightness setting, during the processing of the image data, corresponding to only the outer pixel region.

In another embodiment, a processing system for driving a display having an integrated optical fingerprint sensor, the display having a fingerprint (FP) pixel region and an outer pixel region exclusive of the FP pixel region, is described. The processing system includes: display driver circuitry configured to process image data to drive the display to present an image; and FP illumination logic, disposed in the display driver circuitry, configured to adjust a first brightness setting, during processing of the image data, corresponding to both the FP pixel region and the outer pixel region to provide illumination for the optical fingerprint sensor, and adjust a second brightness setting, during processing of the image data, corresponding to only the outer pixel region.

In another embodiment, an input device includes an optical fingerprint sensor; a display having the optical fingerprint sensor integrated therein, the display having a fingerprint (FP) pixel region and an outer pixel region exclusive of the FP pixel region; and a processing system, coupled to the display. The processing system includes: display driver circuitry configured to process image data to drive the display to present an image; and FP illumination logic, disposed in the display driver circuitry, configured to adjust a first brightness setting, during processing of the image data, corresponding to both the FP pixel region and the outer pixel region to provide illumination for the optical fingerprint sensor, and adjust a second brightness setting, during processing of the image data, corresponding to only the outer pixel region.

In yet another embodiment, a method of providing illumination for an optical fingerprint sensor integrated with a display, the display having a fingerprint (FP) pixel region and an outer pixel region exclusive of the FP pixel region, is described. The method includes processing image data in display driver circuitry configured to drive the display to present an image; adjusting a first brightness setting, during the processing of the image data, corresponding to only the FP pixel region to provide illumination for the optical fingerprint sensor; and adjusting a second brightness setting, during the processing of the image data, corresponding to only the outer pixel region.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 is a block diagram depicting an image processor according to an embodiment.

FIG. 5 is a top-view of an LED display panel according to an embodiment.

FIG. 6 illustrates the brightness of the LED pixels in different regions before and after brightness compensation according to an embodiment.

Figure 1:
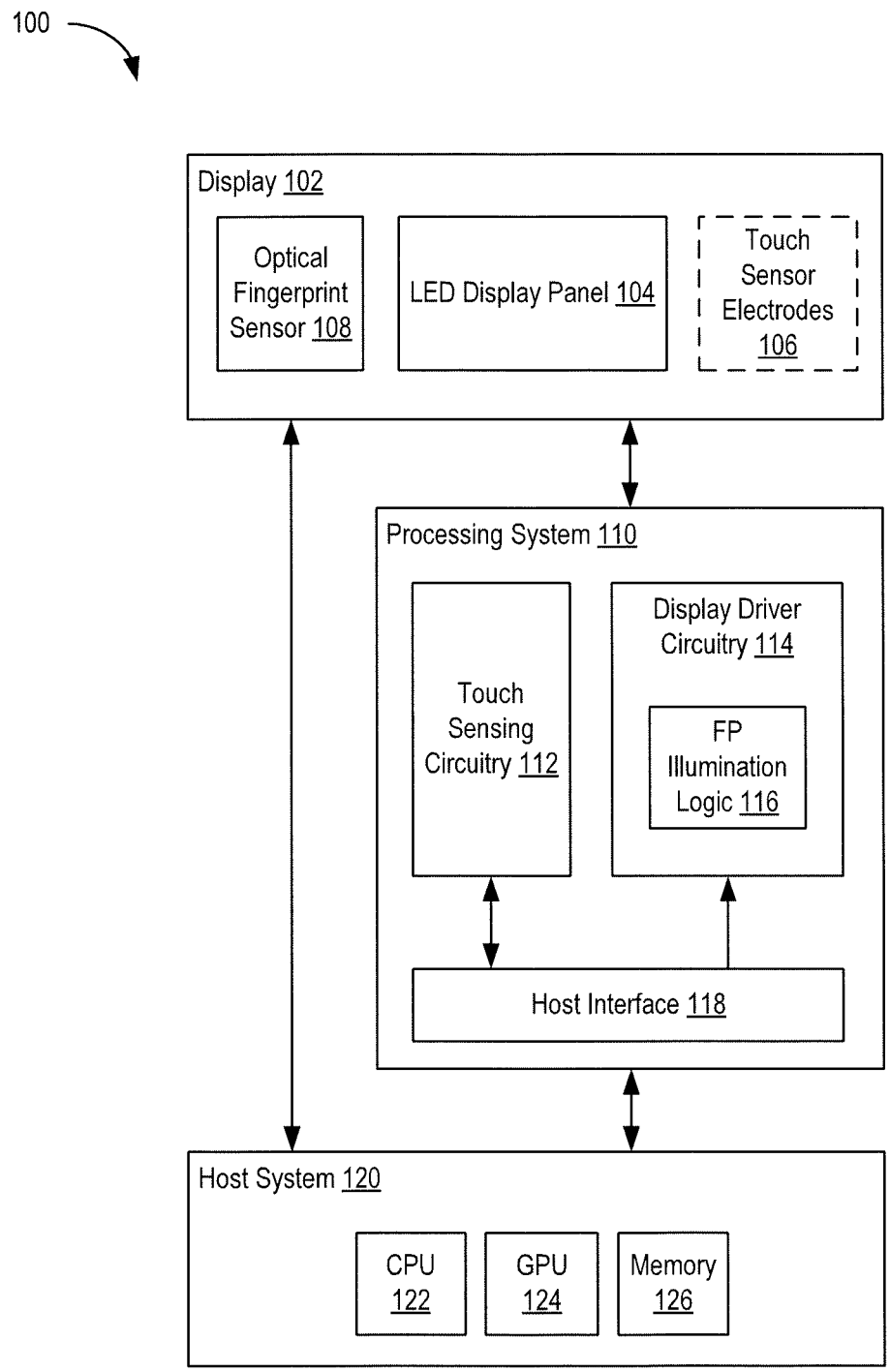
FIG. 1 is a block diagram depicting a system having a display and integrated optical fingerprint sensor.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

FIG. 1 is a block diagram depicting a system 100 having a display 102, a processing system 110, and a host system 120. The display 102 includes an optical fingerprint sensor 108 and a light-emitting diode (LED) display panel 104. In some embodiments, the LED display panel 104 is an organic light emitting diode (OLED) display panel. The processing system 110 includes display driver circuitry 114 and a host interface 118. The host system 120 includes a central processing unit (CPU) 122, a graphics processing unit (GPU) 124, and memory 126. In an embodiment, the display 102 also includes touch sensor electrodes 106. In such an embodiment, the processing system 110 can also include touch sensing circuitry 112.

The optical fingerprint sensor 108 can include a plurality of photosensors (e.g., an array of photodiodes) in an optical fingerprint sensing integrated circuit (IC) or thin-film transistor (TFT)-based sensor disposed behind the LED display panel 104. In another embodiment, the optical fingerprint sensor can include photosensors disposed within the LED display panel 104 (e.g., TFT-layers of a display backplane). The optical fingerprint sensor 108 is coupled to the host system 120. In operation, the optical fingerprint sensor 108 is configured to capture a user's fingerprint and send data indicative of the fingerprint to the host system 120 for processing. The host system 120 can include software, stored in the memory 126 and executable by the CPU 122, configured to process fingerprint data received from the optical fingerprint sensor 108. For example, the host system 120 can use the fingerprint data for authenticating a user.

The display driver circuitry 114 is configured to drive the LED display panel 104 to show an image. The display driver circuitry 114 includes fingerprint (FP) illumination logic 116. The FP illumination logic 116 is configured to control the LED display panel 104 to illuminate a finger proximate the optical fingerprint sensor 108. For example, the FP illumination logic 116 can control the portion of the LED display panel 104 proximate the optical fingerprint sensor 108 when the optical fingerprint sensor 108 is capturing a user's fingerprint. The display driver circuitry 114 receives image data from the host system 120 (e.g., provided by the GPU 124) through the host interface 118. The FP illumination logic 116 can receive commands from the host system 120 for controlling the LED display panel 104 to provide illumination for a finger proximate the optical fingerprint sensor 108 through the host interface 118. The FP illumination logic 116 operates as discussed further below.

When present, the touch sensing circuitry 112 is coupled to the touch sensor electrodes 106. The touch sensing circuitry 112 operates the touch sensor electrodes 106 to perform capacitive sensing of an input object. The touch sensing circuitry 112 can employ absolute capacitive sensing, transcapacitive sensing, or both. The touch sensing circuitry 112 can receive commands from the host system 120 through the host interface 118. The touch sensing circuitry 112 can provide object position data to the host system 120 through the host interface 118.

Figure 2:
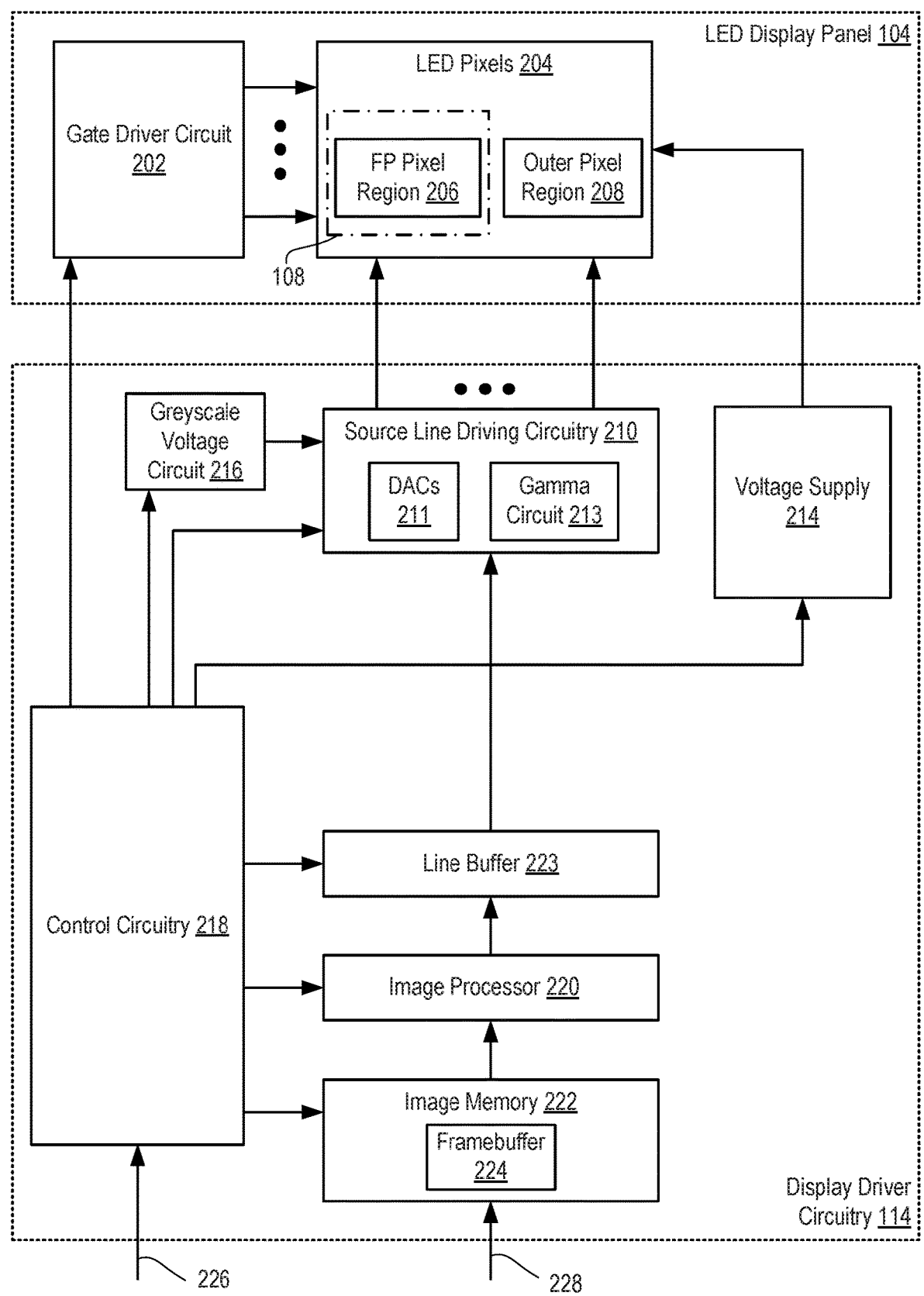
FIG. 2 is a block diagram depicting a light-emitting diode (LED) display panel and display driver circuitry according to an embodiment.

FIG. 2 is a block diagram depicting the LED display panel 104 and the display driver circuitry 114 in more detail according to an embodiment. The LED display panel 104 includes a gate driver circuit 202 and LED pixels 204. The display driver circuitry 114 includes source line driver circuitry 210, a voltage supply 214, a greyscale voltage circuit 216, control circuitry 218, a line buffer 223, an image processor 220, and image memory 222. In some embodiments, the gate driver circuit 202 can be disposed in the display driver circuitry 114 rather than on the LED display panel 104.

In operation, the control circuitry 218 receives control data from the host system 120 through an interface 226. The image memory 222 receives image data from the host system 120 through an interface 228. The image memory 222 can include a framebuffer 224. The image memory 222 can store image frame(s) in the framebuffer 224, where each image frame includes a plurality of lines, and each line includes a plurality of image samples. The image processor 220 reads image data from the image memory 222. The image processor 220 can perform various types of processing on the image samples in the digital domain (e.g., gamma correction, color correction, and the like). As described further below, the image processor 220 also applies a brightness setting to the image data.

The image processor 220 provides lines of image data to the line buffer 223. The line buffer 223 provides digital data indicative of lines in the image data to the source line driver circuitry 210. In an embodiment, the source line driver circuitry 210 includes digital-to-analog converters (DACs 211) and a gamma circuit 213. The source line driver circuitry 210 generates analog signals from the image data using the DACs 211, which are processed by the gamma circuit 213 and coupled to source lines in the LED display panel 104 for controlling the LED pixels 204 to display an image. The greyscale voltage circuit 216 provides greyscale voltages to the source line driver circuitry 210 for setting the greyscale levels. The control circuitry 218 controls the gate driver circuit 202 to control gate lines in the LED display panel 104 to selectively activate lines of the LED pixels 204 to receive source data from the source line driver circuitry 210. The voltage supply 214 provides anode/cathode voltages to the LED pixels 204.

The LED pixels 204 include an FP pixel region 206 and an outer pixel region 208. The FP pixel region 206 includes a plurality of pixels proximate the optical fingerprint sensor 108. FIG. 5 is a top-view of the LED display panel 104 according to an embodiment. In an embodiment, the FP pixel region 206 is partially or completely surrounded by the outer pixel region 208. In the example depicted in FIG. 5, the outer pixel region 208 is rectangular in shape and is surrounded by the FP pixel region 206. The shapes of the outer pixel region 208 and/or the FP pixel region 206 can be other than rectangular. In some embodiments, the size, shape and location of the FP pixel region 206 is fixed relative to the outer pixel region 208. In some embodiments, one or more of the size, shape and location of the FP pixel region 206 is adjustable relative to the outer pixel region 208. In other embodiments, the fingerprint sensor 108 can be larger than the FP pixel region 206 (e.g., up to as large as the entire display). In such embodiments, the FP pixel region 206 and the outer pixel region 208 can be in different locations for different instances of fingerprint capture (e.g., top, bottom, sides, etc.). In addition, in such embodiments, the FP pixel region 206 can change size and/or shape from one capture to another. In an embodiment, the FP pixel region 206 has at least one edge boarding the outer pixel region 208.

The display driver circuitry 114 can control a brightness setting of the image data using different techniques. In one technique, the image processor 220 adjusts the digital samples of the image data in the digital domain when reading from the image memory 222. For example, the samples stored in the image memory 222 can be represented using red, green, and blue (RGB) values and the image processor 220 can adjust the RGB values to adjust the brightness of one or more image samples. The image processor 220 is capable of providing both global brightness adjustments, and localized brightness adjustments on a per pixel basis, in the digital domain.

In another technique, the greyscale voltage circuit 216 can adjust the greyscale voltages provided to the source line driver circuitry 210. Adjusting the greyscale voltages provides for a global brightness adjustment in the analog domain. In another technique, brightness can be adjusted based on an analog adjustment of the gamma curve applied by the gamma circuit 213. In another technique, the voltage supply 214 can adjust the difference between the anode and cathode voltages applied to the LED pixels 204 to increase or decrease the brightness. This voltage adjustment can provide a global brightness control in the analog domain. In another technique, the gate driver circuit 202 can control the emission period of LED pixels 204. The gate driver circuit 202 can implement global brightness control in the analog domain. Any global brightness increase can be compensated by adjusting the value of the digital image samples in an inverse fashion, as discussed further herein.

The control circuitry 218 can control the image processor 220, the greyscale voltage circuit 216, the gamma circuit 213, the voltage supply 214, and/or the gate driver circuit 202 to control the brightness of the image data that is provided to the display panel 104. The control circuitry 218 can implement a global brightness adjustment, localized brightness adjustment, or a combination thereof by adjusting one or more brightness settings.

In an embodiment, the display driver circuitry 114 implements a global brightness increase of the image data to provide illumination of a finger for the optical fingerprint sensor 108. Applying global brightness increase allows for a low-cost implementation of illumination for the optical fingerprint sensor 108. For example, the greyscale voltage circuit 216 can increase the greyscale levels for an increase in brightness during fingerprint sensing. Alternatively, the voltage supply 214 can increase the difference between anode and cathode voltage across the LED pixels 204 during fingerprint sensing. In yet another alternative, the image processor 220 can apply a different gamma correction that results in increased global brightness during the fingerprint operation. In another embodiment, some combination of these global brightness adjustment techniques is performed. The control circuitry 218 instructs the greyscale voltage circuit 216, the gamma circuit 213, the image processor 220, and/or the voltage supply 214 to implement two different brightness states, one for normal conditions and one for fingerprint sensing operation.

However, as noted above, the global brightness adjustment causes flickers, flashes, or the like, which detract from the user's experience. In an embodiment, the display driver circuitry 114 mitigates the brightness increase in the outer pixel region 208 caused by the global brightness adjustment by providing an inverse brightness adjustment using a localized brightness adjustment technique. The display driver circuitry 114 can lower the brightness of the image data corresponding to the outer pixel region 208 by substantially the same magnitude of the global brightness increase. In this manner, the brightness of the image data corresponding to the FP pixel region 206 is increased, while the brightness of the image data corresponding to the outer pixel region 208 remains substantially the same as prior to the fingerprint sensing operation. This prevents or mitigates image flicker during fingerprint sensing operation.

In an embodiment, the image processor 220 is disposed after the line buffer 223 rather than before the line buffer 223. In such an embodiment, the image processor 220 operates on the image samples stored in the line buffer 223, rather than the image samples stored in the image memory 222 (e.g., the framebuffer 224).

Figure 3:
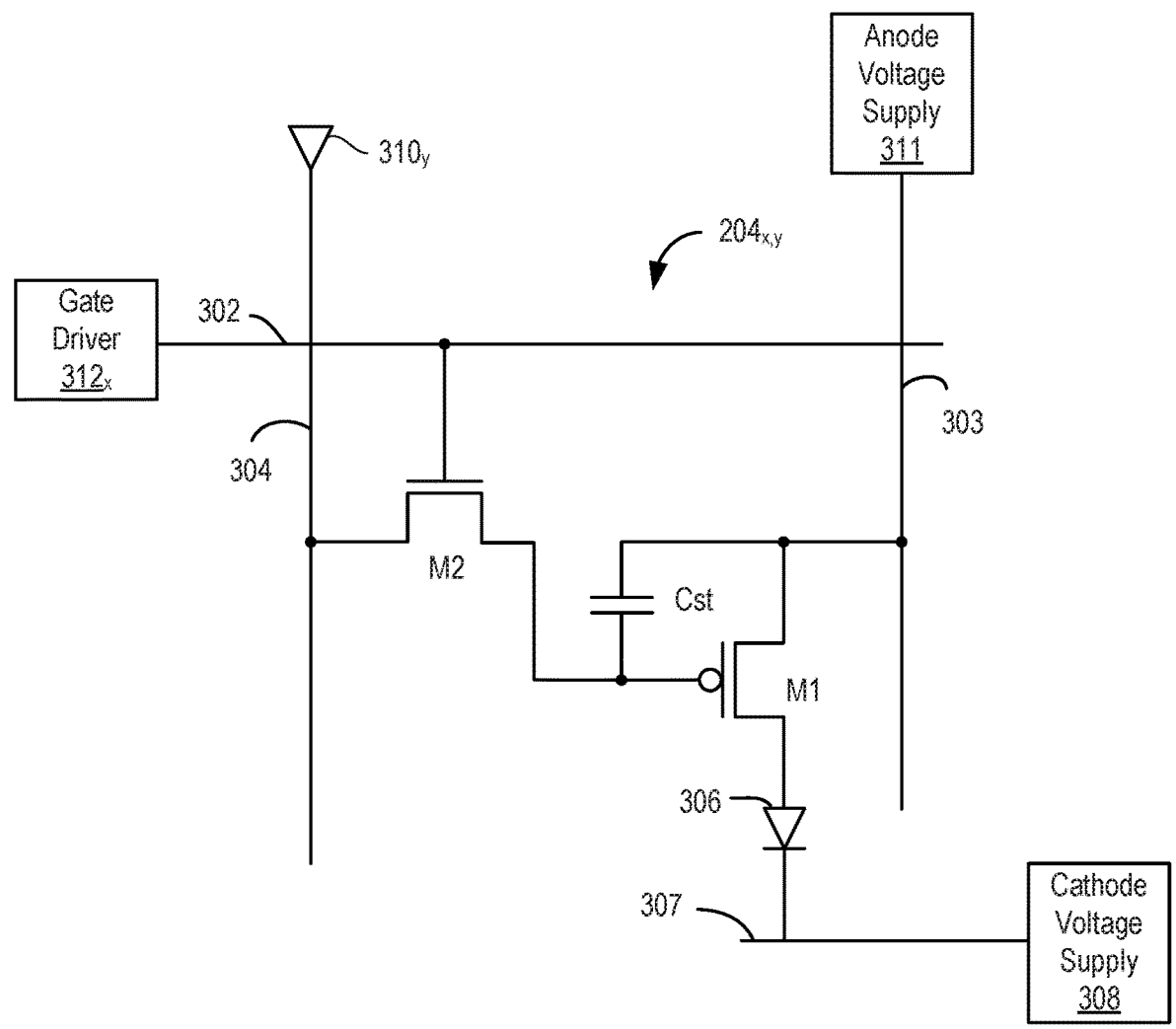
FIG. 3 is a schematic diagram depicting an LED pixel and associated drive circuitry according to an embodiment.

FIG. 3 is a schematic diagram depicting an LED pixel and associated drive circuitry according to an embodiment. An LED pixel $204_{x,y}$ in a 2D array of the LED pixels 204 includes an n-channel field effect transistor (FET) M2, a p-channel FET M1, a capacitor Cst, and an LED 306. The FETs M1 and M2 can be TFTs. An anode of the LED 306 is coupled between a drain of the transistor M1 and a cathode electrode 307. The source of the transistor M1 is coupled to a supply line 303. The capacitor Cst is coupled between the supply line 303 and the gate of the transistor M1. The gate and source of the transistor M1 are capacitively coupled by way of the capacitor Cst. The drain of the transistor M1 is coupled to the anode of the LED 306. A gate of the transistor M2 is coupled to a gate line 302. A drain of the transistor M2 is coupled to the gate of the transistor M1. A source of the transistor M2 is coupled to a source line 304. The source line 304 is coupled to a source driver $310_y$ in the source line driver circuitry 210. The gate line 302 can be coupled to a gate driver $312_x$ in the gate driver circuit 202. An anode voltage supply 311 is coupled to the supply line 303. A cathode voltage supply 308 is coupled to the cathode electrode 307.

To emit light (when displaying an image), the LED 306 can be forward-biased (and can thus have current flowing through it). To forward-bias the LED 306, the voltage at the gate line 302 can be sufficiently high to turn on the transistor M2. When the transistor M2 is on, the transistor M2 can act substantially as a short-circuit and can cause the voltage at the source line 304 to be substantially mirrored at the gate of the transistor M1 and the voltage stored on Cst. The voltage at the source line 304, and thus the voltage at the gate of the transistor M1, can be sufficiently low relative to the anode supply voltage to turn on the current-controlling transistor M1. When the transistor M1 is on, the transistor M1 can act substantially as current source and can cause the voltage at the anode of the LED 306 to be maintained at a voltage for a controlled current through the LED 306. For the LED 306 to be forward biased, the voltage at the anode must be higher than the voltage at the cathode electrode 307. The configuration of the LED pixel shown in FIG. 3 is merely one example of various types of LED pixels that can be included in an LED display.

The brightness of the LED pixel 204 is controlled by changing the gate-to-source voltage of the transistor M1. The gate-to-source voltage of the transistor M1 is set by the source driver $310_y$. The source driver $310_y$ receives input digital codes and outputs analog voltages for setting the gate-to-source voltage of the transistor M1. The source driver $310_y$ is configured to control intensity of emitted light from the first LED pixel in response to the input digital code. The source driver $310_y$ generates a voltage in response to the input digital code that controls a current through the LED.

FIG. 4 is a block diagram depicting an image processor 220 according to an embodiment. In an embodiment, the image processor 220 includes a localized brightness control circuit 402. The localized brightness control circuit 402 is configured to provide a localized brightness adjustment of the image data on a pixel-by-pixel basis.

In an embodiment, the localized brightness control circuit 402 provides a localized brightness adjustment to the image data that is the inverse of a globalized brightness adjustment applied to the image data. For example, the greyscale voltage circuit 216 can implement a global brightness adjustment by adjusting the greyscale levels. The localized brightness control circuit 402 can provide an inverse adjustment to only those image samples for pixels in the outer pixel region 208. In this manner, when presenting an image on the LED display panel 104, only the pixels in the FP pixel region 206 have a brightness increase to provide illumination for the optical fingerprint sensor 108. In another embodiment, the global brightness control can be implemented by the voltage supply 214 rather than the greyscale voltage circuit 216. In yet another embodiment, the global brightness control can be implemented by the gamma circuit 213. For example, the gamma circuit 213 can select another gamma curve that results in an increase in global brightness of the image data. In yet another embodiment, the global brightness control can be implemented by a combination of analog and digital adjustments. In each embodiment, the localized brightness control circuit 402 is configured to provide an inverse brightness adjustment to the image samples corresponding to the outer pixel region 208 to compensate for a global brightness increase to the image data.

While the localized brightness control circuit 402 is shown in the image processor 220, in other embodiments, the localized brightness control circuit 402 can be implemented external to the image processor 220 as a separate circuit or as part of another circuit. In particular, in an embodiment, the localized brightness control circuit 402 can operate on the image samples prior to being stored in the image memory 222.

Figure 7:
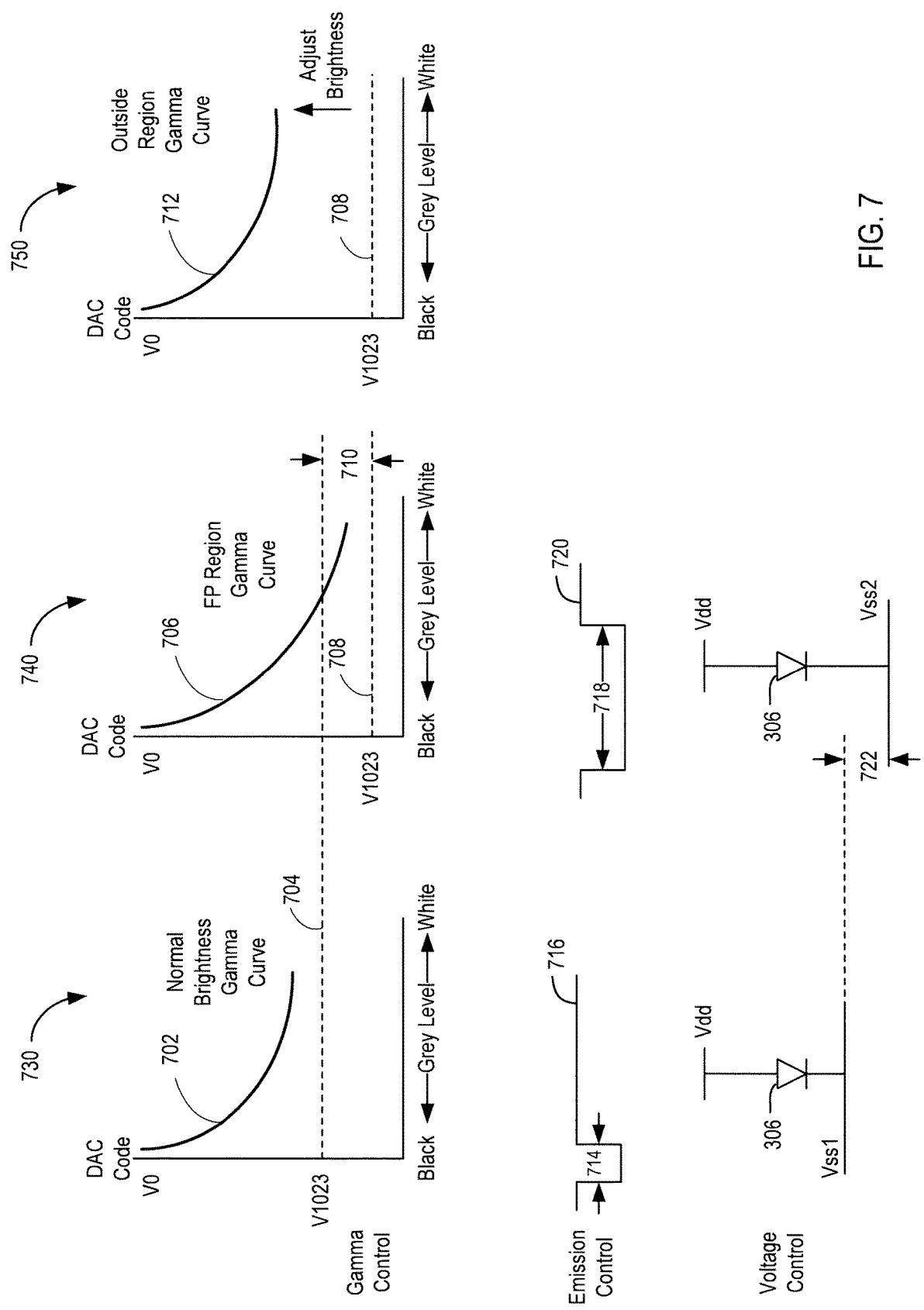
FIG. 7 graphically illustrates different brightness adjustments according to embodiments.
Figure 8:
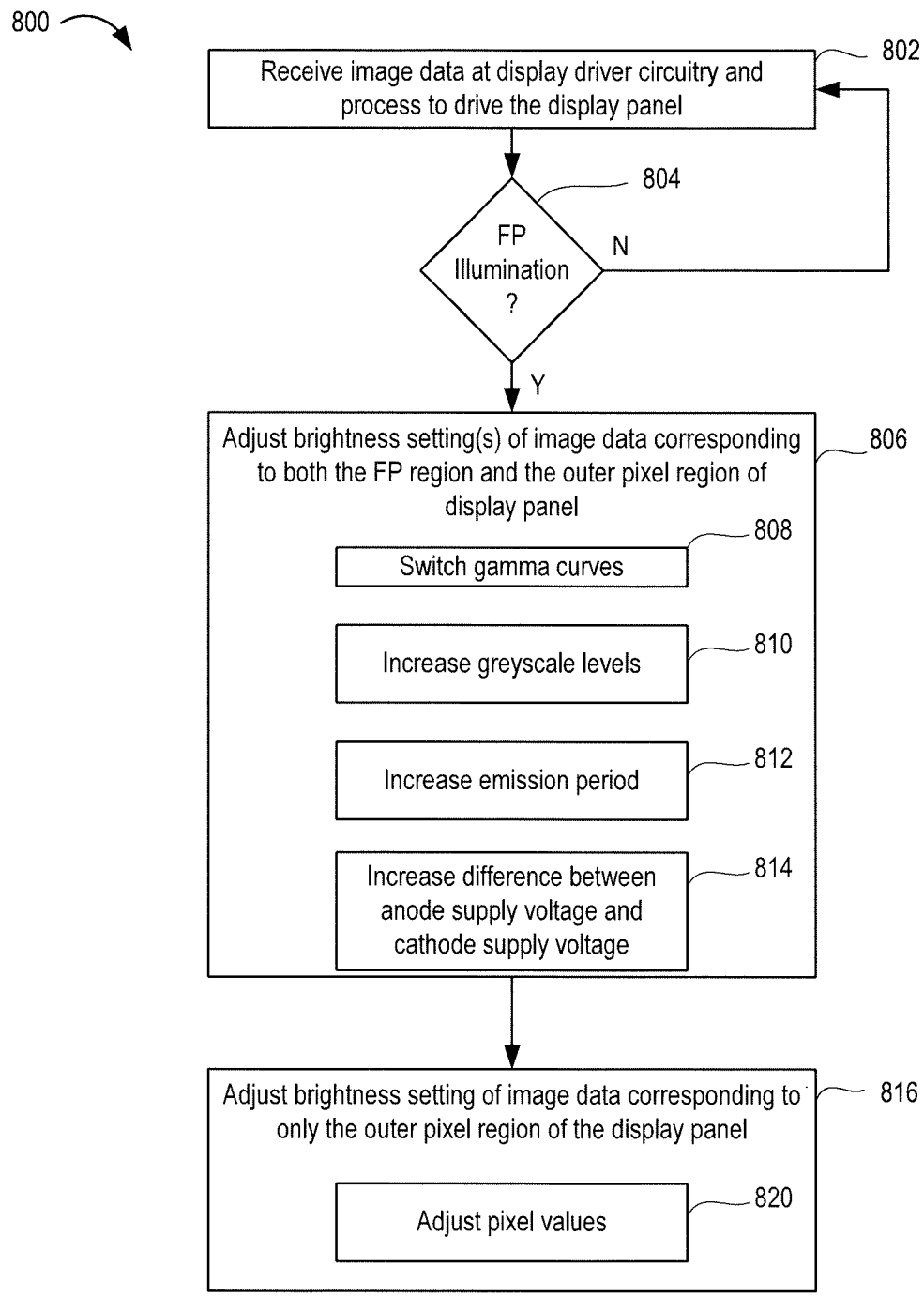
FIG. 8 is a flow diagram depicting a method of adjusting brightness of image data according to an embodiment.

FIG. 6 illustrates the brightness of the LED pixels 204 in different regions according to an embodiment. FIG. 7 graphically illustrates different brightness adjustments according to embodiments. FIG. 8 is a flow diagram depicting a method of adjusting brightness of image data according to an embodiment. The method 800 of FIG. 8 can be understood with reference to the illustrations shown in FIGS. 6 and 7, as described further below.

The method 800 begins at step 802, where the display driver circuitry 114 receives image data and processes the image data to drive the display panel to present an image. At step 804, the display driver circuitry 114 determines whether illumination is required for a fingerprint sensing operation. If not, the method 800 returns to step 802. If FP illumination is not required, the display driver circuitry 114 sets the brightness of the image data to a normal brightness. Normal brightness is the brightness used when the fingerprint sensing operation is not performed. Otherwise, the method 800 proceeds to step 806. The display driver circuitry 114 can receive an indication that illumination is required from the host system 120.

FIG. 7 shows the gamma control, emission control, and voltage control for the normal brightness condition. A graph 730 illustrates the gamma curve applied by the gamma circuit 213 in the normal brightness condition. The graph 730 includes a horizontal axis representing grey level and a vertical axis representing a digital to analog converter (DAC) input code. V0 indicates the lowest DAC code and D1023 indicates the highest DAC code in the example. For the normal brightness condition, the gamma circuit 213 applies a gamma curve 702, which is referred to as the normal brightness gamma curve. Further, in the normal brightness condition, the gate driver circuit 202 provides emission control waveform 716 having a normal emission period 714. Further, in the normal brightness condition, the voltage supply 214 maintains a normal difference between anode voltage (Vdd) and cathode voltage (Vss1).

At step 806, the display driver circuitry 114 adjusts one or more brightness settings of the image data corresponding to both the FP region and the outer pixel region of the display panel. In an embodiment, the display driver circuitry 114 employs a global brightness adjustment to increase the brightness of the image data. The global brightness increase can be achieved using different techniques as described herein, including analog and/or digital techniques. For example, at step 808, the gamma circuit 213 can switch gamma curves from the normal brightness gamma curve to an FP brightness gamma curve. Use of the FP brightness gamma curve results in increased brightness of the image data, including the portion of the image data corresponding to the FP pixel region 206. This is illustrated by the schematic 602 in FIG. 6, which shows that image pixels corresponding to both the FP pixel region 206 and the outer pixel region 208 have an increased brightness. FIG. 7 shows a graph 740 of the FP brightness gamma curve, where the highest DAC level (e.g., V1023) is increased from a level 704 to a level 708 (a difference of 710). This stretching of the gamma curve increases greyscale values of the image samples and thus brightness of the image data.

In another example, at step 810, the greyscale voltage circuit 216 can increase the greyscale levels, effectively increasing the brightness of the image data. In another example, at step 812, the gate driver circuit 202 can increase the emission period from the normal emission period 714 to an increased emission period 718 as shown in the emission control waveform 720 (FIG. 7). In another example, at step 814, the voltage supply 214 increases the anode-to-cathode voltage for the LED pixels 204. For example, the cathode voltage can be decreased from Vss1 to Vss2, resulting in an increase 722 in anode-to-cathode voltage (FIG. 7). In other embodiments, some combination of steps 808-814 can be performed to increase global brightness of the image data during processing of the image data by the display driver circuitry 114.

At step 816, the display driver circuitry 114 adjusts a brightness setting of image data corresponding to only the outer pixel region of the display panel. The image processor 220 performs a brightness correction for the outer pixel region 208. FIG. 7 shows a graph 750 of an effective gamma curve 712 for the outer pixel region 208. The brightness is adjusted by reducing the highest DAC level from the normal level 704. In an embodiment, at step 820, the display driver circuitry 114 adjusts individual pixel values of the image data (i.e., image samples) to compensate for the global brightness increase. The localized brightness control circuit 402 can determine the amount of compensation mathematically using an algorithm or equation, or using a lookup table or the like with values determined empirically. In an embodiment, the localized brightness control circuit 402 adjusts the image samples that correspond to the outer pixel region using a transform that is an inverse of the increase in the brightness of the image data. In this manner, the user perceives little or no increase in brightness of the LED pixels in the outer pixel region, which the LED pixels in the FP pixel region emit brighter light for illuminating a finger during a fingerprint sensing operation. This is illustrated by the schematic 606 in FIG. 6, which shows that image pixels corresponding to only the FP pixel region 206 have an increased brightness after the compensation.

Figure 9:
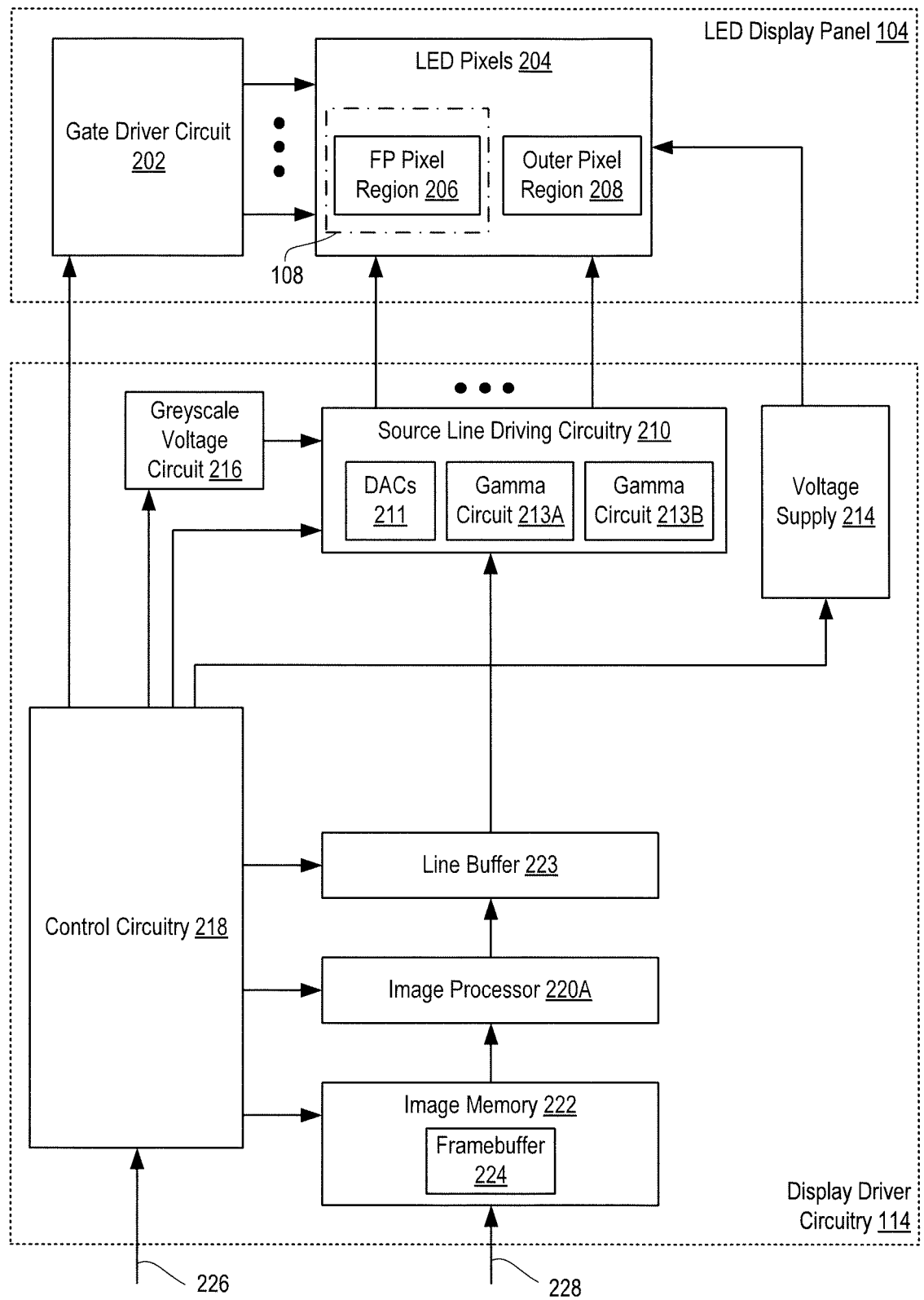
FIG. 9 is a block diagram depicting an LED display panel and display driver circuitry according to another embodiment.

FIG. 9 is a block diagram depicting the LED display panel 104 and the display driver circuitry 114 in more detail according to another embodiment. Elements of FIG. 9 that are the same or similar to those of FIG. 2 are designated with identical reference numerals and are described above. In this embodiment, the source line driver circuitry 210 includes two gamma circuits 213A and 213B. The gamma circuit 213A processes the portion of the image data corresponding to the FP pixel region 206. The gamma circuit 213B processes the portion of the image data corresponding to the outer pixel region 208. The gamma circuit 213A applies a different gamma curve than that applied by the gamma circuit 213B so that the portion of the image corresponding to the FP pixel region 206 is brighter than the portion of the image data corresponding to the outer pixel region 208. For example, the gamma circuit 213A can apply the gamma curve 706, while the gamma circuit 213B can apply a normal gamma curve (e.g., the gamma curve 702). In this manner, the user perceives little or no increase in brightness of the outer pixel region 208, while FP pixel region 206 has a brightness increase for illuminating a finger during fingerprint sensing. In this embodiment, no further processing of the image data is required, including no further global brightness adjustments or localized digital adjustments.

Figure 10:
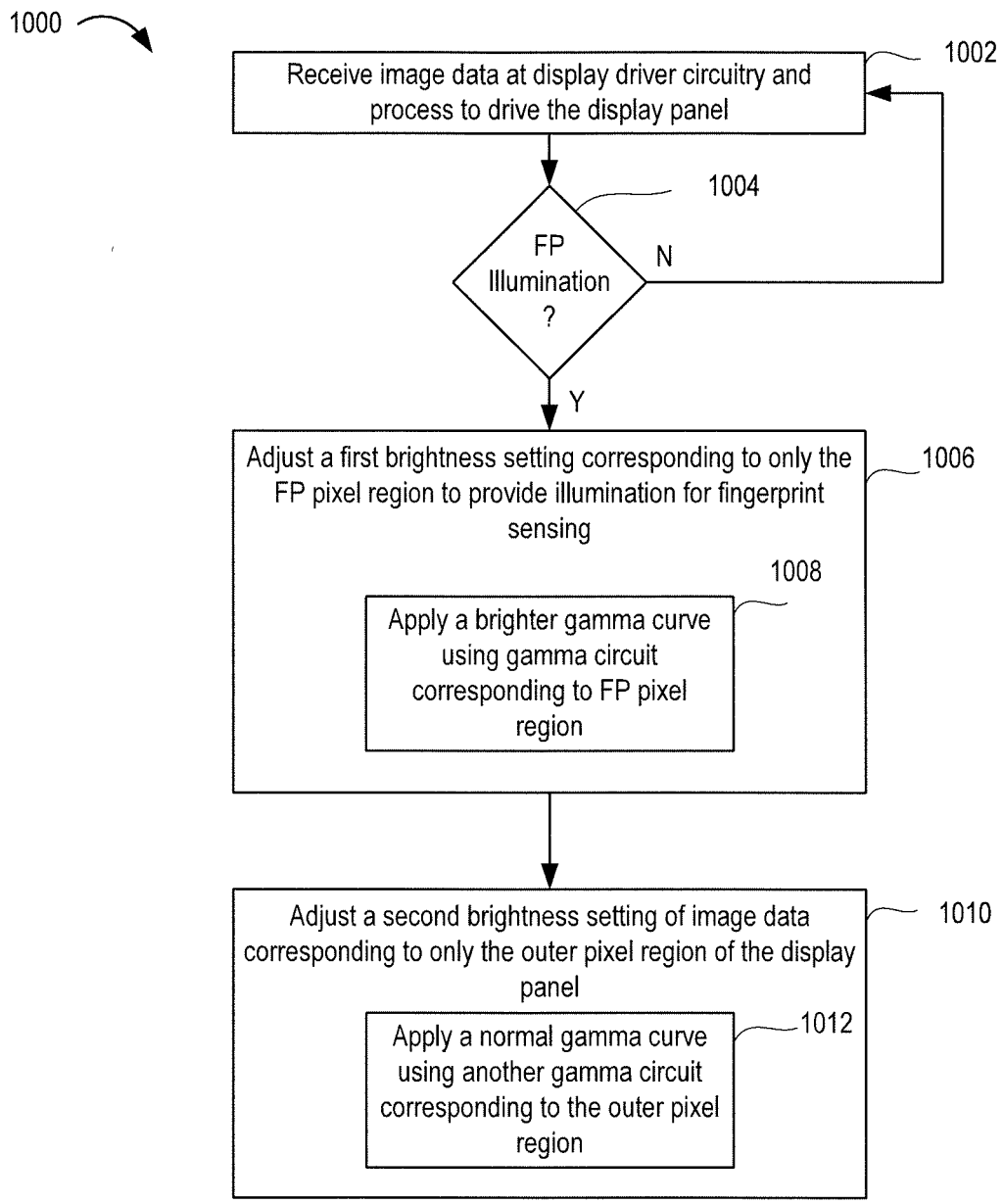
FIG. 10 is a flow diagram depicting a method of adjusting brightness of image data according to another embodiment.

FIG. 10 is a flow diagram depicting a method of adjusting brightness of image data according to another embodiment. The method 1000 begins at step 1002, where the display driver circuitry 114 receives image data and processes the image data to drive the display panel to present an image. At step 1004, the display driver circuitry 114 determines whether illumination is required for a fingerprint sensing operation. If not, the method 1000 returns to step 1002. If FP illumination is not required, the display driver circuitry 114 sets the brightness of the image data to a normal brightness. Normal brightness is the brightness used when the fingerprint sensing operation is not performed. For example, each of the gamma circuits 213A and 213B can apply a normal gamma curve to the image data. Otherwise, the method 1000 proceeds to step 1006. The display driver circuitry 114 can receive an indication that illumination is required from the host system 120.

At step 1006, the display driver circuitry 114 adjusts a first brightness setting corresponding to only the FP pixel region 206 to provide illumination for fingerprint sensing. For example, at step 1008, the gamma circuit 213B can apply a brighter gamma curve to the portion of the image data corresponding to the FP pixel region 206. The increased brightness in the FP pixel region 206 provides illumination for the finger during the fingerprint sensing operation. At step 1010, the display driver circuitry 114 adjusts a second brightness setting of image data corresponding to only the outer pixel region 208 of the display panel. For example, at step 1012, the gamma circuit 213B applies a normal gamma curve to the portion of the image data corresponding to the outer pixel region 208. In this manner, the user perceives no increase in brightness of the presented image in the outer pixel region 208.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. A method of providing illumination for an optical fingerprint sensor integrated with a display, the display having a fingerprint (FP) pixel region and an outer pixel region exclusive of the FP pixel region, the method comprising:
   processing image data in display driver circuitry configured to drive the display to present an image;
   adjusting, via one or more of a gate driver circuit, a greyscale voltage circuit, a gamma circuit, and a voltage supply, a first brightness setting, during the processing of the image data, corresponding to both the FP pixel region and the outer pixel region to provide illumination for the optical fingerprint sensor;
   determining, via a localized brightness control circuit, compensation amounts for individual pixel values of the outer pixel region based on the adjusted first brightness setting; and adjusting, via the localized brightness control circuit, a second brightness setting based on the determined compensation amounts, during the processing of the image data, corresponding to only the outer pixel region.

2. The method of claim 1, wherein the step of adjusting the first brightness setting comprises:
   switching from applying a first gamma curve to applying a second gamma curve during the processing of the image data.

3. The method of claim 1, wherein the step of adjusting the first brightness setting comprises:
   increasing greyscale voltage levels used by source line driver circuitry of the display driver circuitry during the processing of the image data.

4. The method of claim 1, wherein the step of adjusting the first brightness setting comprises:
   increasing an emission period of pixels in the display.

5. The method of claim 1, wherein the step of adjusting the first brightness setting comprises:
   increasing a difference between an anode supply voltage and a cathode supply voltage for light-emitting diode (LED) pixels of the display.

6. The method of claim 1, wherein the step of adjusting the second brightness setting comprises adjusting only those digital samples representing the image data that correspond with the outer pixel region.

7. The method of claim 6, wherein the step of adjusting the second brightness setting comprises adjusting the digital samples that correspond with the outer pixel region prior to storage in a buffer of the display driver circuitry or adjusting the digital samples stored in the buffer.

8. The method of claim 6, wherein the step of adjusting the first brightness setting comprises increasing brightness of the image data corresponding to both the FP pixel region and the outer pixel region, and wherein the step of adjusting the second brightness setting comprises adjusting the digital samples that correspond with the outer pixel region using a transform that is an inverse of the increase in the brightness of the image data.

9. A processing system for driving a display having an integrated optical fingerprint sensor, the display having a fingerprint (FP) pixel region and an outer pixel region exclusive of the FP pixel region, the processing system comprising:
   display driver circuitry configured to process image data to drive the display to present an image; and
   FP illumination logic, disposed in the display driver circuitry, configured to:
      adjust, via one or more of a gate driver circuit, a greyscale voltage circuit, a gamma circuit, and a voltage supply, a first brightness setting, during processing of the image data, corresponding to both the FP pixel region and the outer pixel region to provide illumination for the optical fingerprint sensor;
      determine, via a localized brightness control circuit, compensation amounts for individual pixel values of the outer pixel region based on the adjusted first brightness setting; and adjust, via the localized brightness control circuit, a second brightness setting based on the determined compensation amounts, during processing of the image data, corresponding to only the outer pixel region.

10. The processing system of claim 9, wherein the gamma circuit is configured to process the image data, wherein the FP illumination logic is configured to control the gamma circuit to switch from a first gamma curve to a second gamma curve during adjustment of the first brightness setting.

11. The processing system of claim 9, further comprising:
source line driver circuitry configured to drive source lines in the display, wherein the greyscale voltage circuit is configured to provide greyscale reference voltages to the source line driver circuitry, and
wherein the FP illumination logic is configured to control the greyscale voltage circuit to increase the greyscale reference voltages during adjustment of the first brightness setting.

12. The processing system of claim 9, wherein the gate driver circuit is configured to increase an emission period of pixels in the display during adjustment of the first brightness setting.

13. The processing system of claim 9, wherein the voltage supply is configured to supply anode and cathode voltages to light-emitting diode (LED) pixels of the display, and
wherein the FP illumination logic is configured to control the voltage supply to increase a difference between the anode and cathode voltages during adjustment of the first brightness setting.

14. The processing system of claim 9, wherein the FP illumination logic is configured to adjust the second brightness setting by adjusting only those digital samples representing the image data that correspond with the outer pixel region.

15. The processing system of claim 14, wherein the FP illumination logic is configured to adjust the second brightness setting by adjusting the digital samples that correspond with the outer pixel region prior to storage in a buffer of the display driver circuitry or adjusting the digital samples stored in the buffer.

16. The processing system of claim 14, wherein the FP illumination logic is configured to adjust the first brightness setting by increasing brightness of the image data corresponding to both the FP pixel region and the outer pixel region, and wherein the FP illumination logic is configured to adjust the second brightness setting by adjusting the digital samples that correspond with the outer pixel region using a transform that is an inverse of the increase in the brightness of the image data.

17. An input device, comprising:
an optical fingerprint sensor;
a display having the optical fingerprint sensor integrated therein, the display having a fingerprint (FP) pixel region and an outer pixel region exclusive of the FP pixel region; and
a processing system, coupled to the display, the processing system including:
display driver circuitry configured to process image data to drive the display to present an image; and
FP illumination logic, disposed in the display driver circuitry, configured to:
adjust, via one or more of a gate driver circuit, a greyscale voltage circuit, a gamma circuit, and a voltage supply, a first brightness setting, during processing of the image data, corresponding to both the FP pixel region and the outer pixel region to provide illumination for the optical fingerprint sensor;
determine, via a localized brightness control circuit, compensation amounts for individual pixel values of the outer pixel region based on the adjusted first brightness setting; and
adjust, via the localized brightness control circuit, a second brightness setting based on the determined compensation amounts, during processing of the image data, corresponding to only the outer pixel region.

18. The input device of claim 17, wherein the gamma circuit is configured to process the image data, wherein the FP illumination logic is configured to control the gamma circuit to switch from a first gamma curve to a second gamma curve during adjustment of the first brightness setting.

19. The input device of claim 17, wherein the gate driver circuit is configured to increase an emission period of pixels in the display during adjustment of the first brightness setting.

20. The input device of claim 17, wherein the FP illumination logic is configured to adjust the second brightness setting by adjusting only those digital samples representing the image data that correspond with the outer pixel region.

21. The input device of claim 20, wherein the FP illumination logic is configured to adjust the second brightness setting by adjusting the digital samples that correspond with the outer pixel region prior to storage in a buffer of the display driver circuitry or adjusting the digital samples stored in the buffer.

22. The input device of claim 20, wherein the FP illumination logic is configured to adjust the first brightness setting by increasing brightness of the image data corresponding to both the FP pixel region and the outer pixel region, and wherein the FP illumination logic is configured to adjust the second brightness setting by adjusting the digital samples that correspond with the outer pixel region using a transform that is an inverse of the increase in the brightness of the image data.

23. A method of providing illumination for an optical fingerprint sensor integrated with a display, the display having a fingerprint (FP) pixel region and an outer pixel region exclusive of the FP pixel region, the method comprising:
processing image data in display driver circuitry configured to drive the display to present an image;
adjusting, via one or more of a gate driver circuit, a greyscale voltage circuit, a gamma circuit, and a voltage supply, a first brightness setting, during the processing of the image data, corresponding to only the FP pixel region to provide illumination for the optical fingerprint sensor;
determining, via a localized brightness control circuit, compensation amounts for individual pixel values of the outer pixel region based on the adjusted first brightness setting; and
adjusting, via the localized brightness control circuit, a second brightness setting based on the compensation amounts, during the processing of the image data, corresponding to only the outer pixel region.

24. The method of claim 23, wherein the step of adjusting the first brightness setting comprises:
applying a first gamma curve to a first portion of the image data corresponding to only the FP pixel region using a first gamma circuit in the display driver circuitry, the first gamma curve increasing brightness of the first portion of the image data with respect to a second gamma curve.

25. The method of claim 24, wherein the step of adjusting the second brightness setting comprises:
applying the second gamma curve to a second portion of the image data corresponding only to the outer pixel region using a second gamma circuit in the display driver circuitry.

26. A processing system for driving a display having an integrated optical fingerprint sensor, the display having a fingerprint (FP) pixel region and an outer pixel region exclusive of the FP pixel region, the processing system comprising:
display driver circuitry configured to process image data to drive the display to present an image; and
FP illumination logic, disposed in the display driver circuitry, configured to:
adjust, via one or more of a gate driver circuit, a greyscale voltage circuit,
a gamma circuit, and a voltage supply, a first brightness setting, during the processing of the image data, corresponding to only the FP pixel region to provide illumination for the optical fingerprint sensor;
determine, via a localized brightness control circuit, compensation amounts for individual pixel values of the outer pixel region based on the adjusted first brightness setting; and
adjust, via the localized brightness control circuit, a second brightness setting based on the determined compensation amounts, during the processing of the image data, corresponding to only the outer pixel region.

27. The processing system of claim 26, wherein the display driver circuitry comprises a first gamma circuit configured to process a first portion of the image data corresponding only to the FP pixel region, and a second gamma circuit configured to process a second portion of the image data corresponding to only the outer pixel region, and wherein the FP illumination logic is configured to adjust the first brightness setting by utilizing a first gamma curve, the first gamma curve increasing brightness of the first portion of the image data with respect to a second gamma curve.

28. The processing system of claim 27, wherein the FP illumination logic is configured to adjust the second brightness setting by utilizing the second gamma curve.

* * * * *